Aug. 11, 1931.  J. H. HAMMOND, JR  1,818,708
RADIO DYNAMIC CONTROL OF GLIDING BODIES
Original Filed Nov. 15, 1922  8 Sheets-Sheet 1
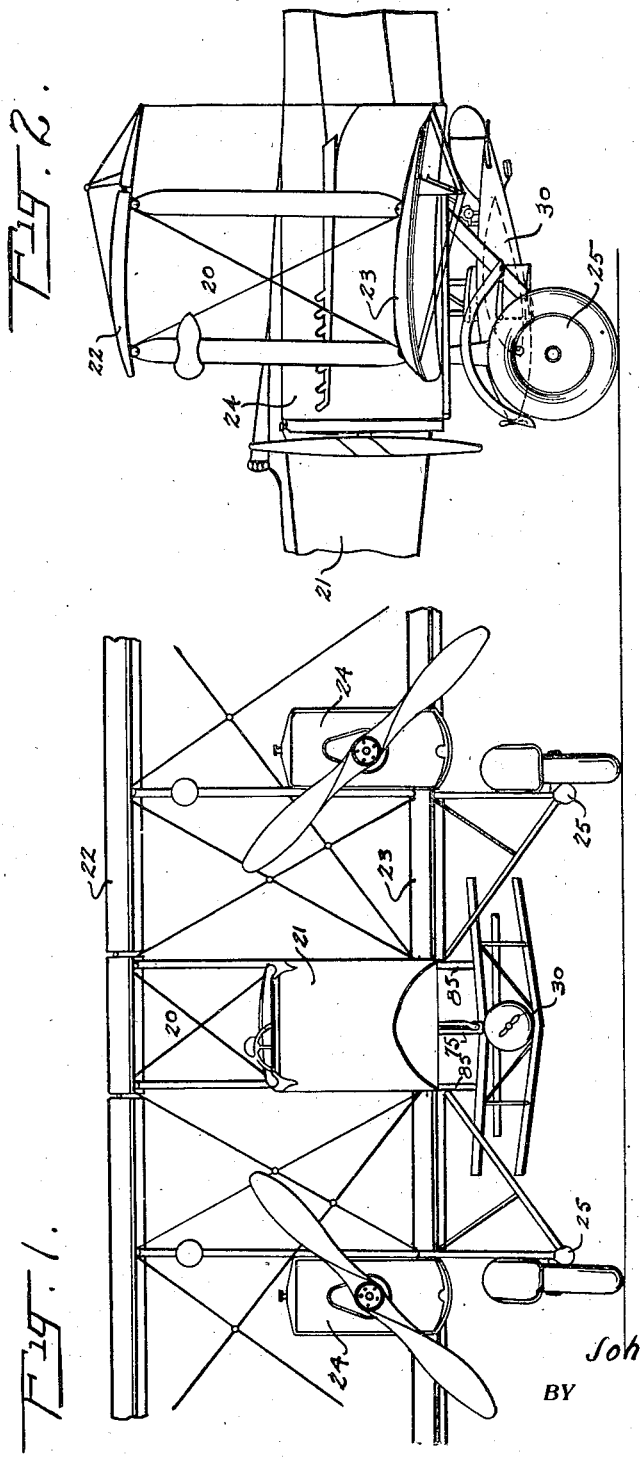
INVENTOR
John Hays Hammond Jr
BY
ATTORNEY

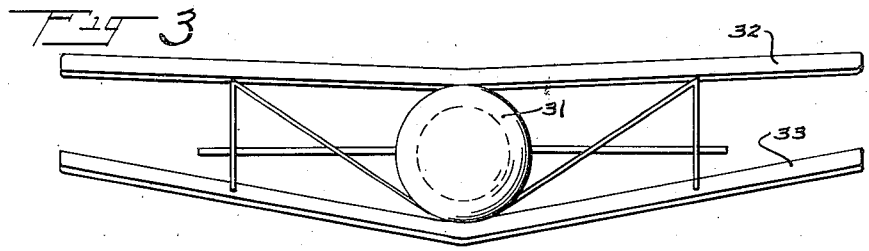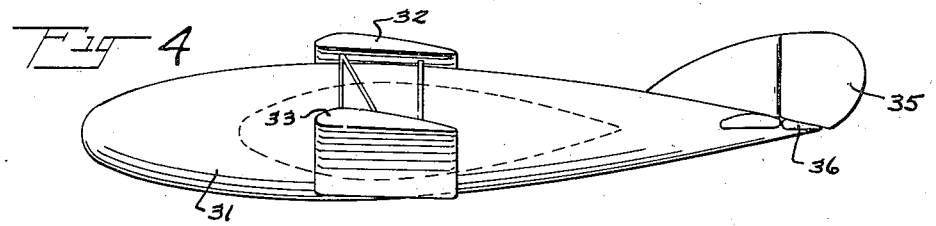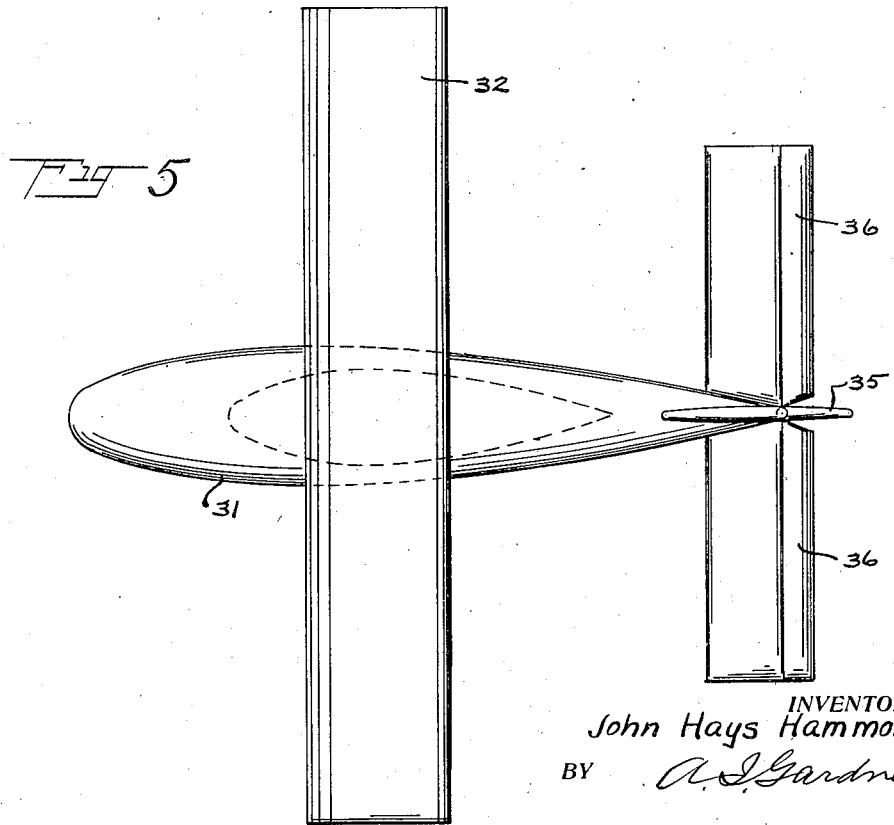

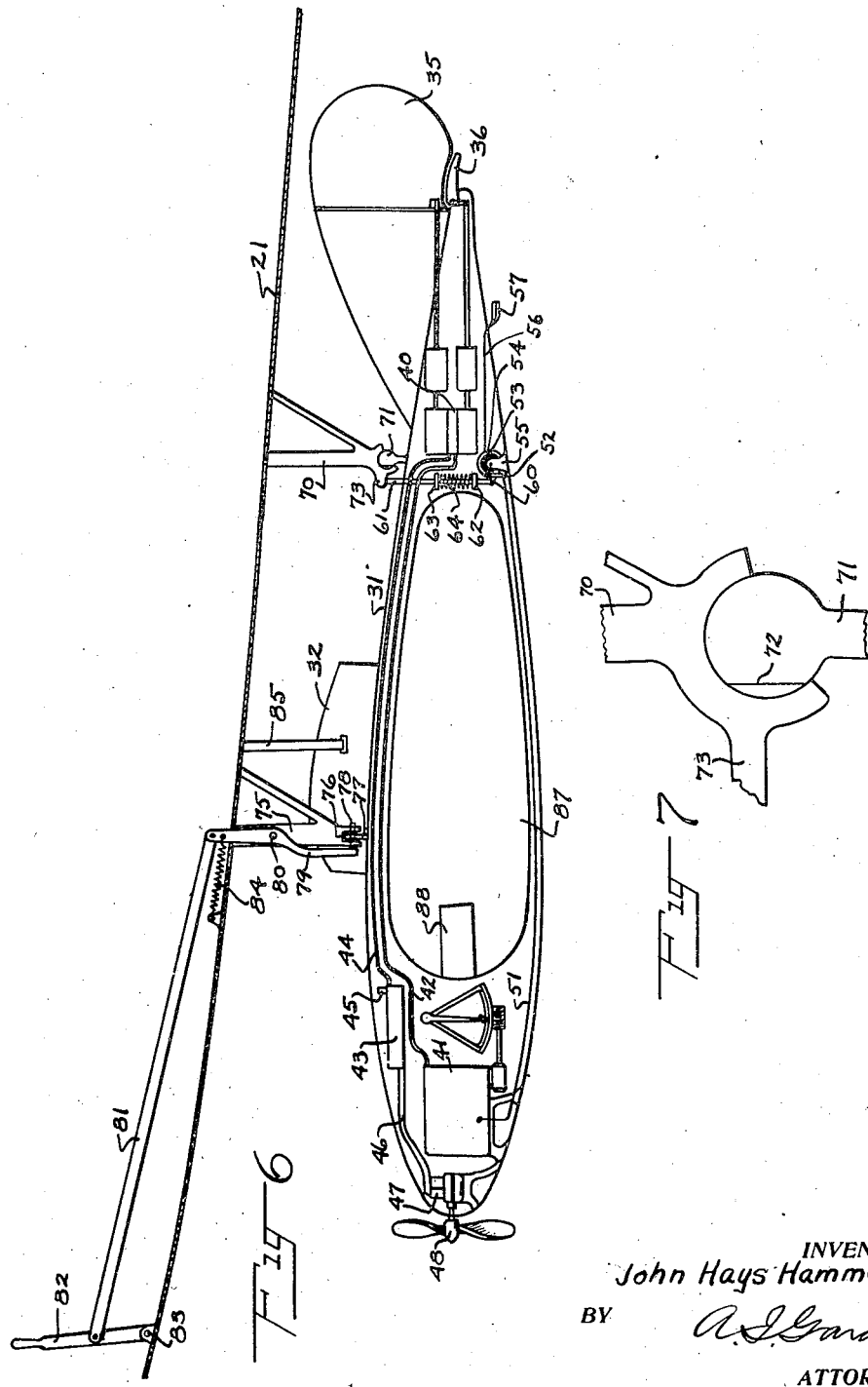

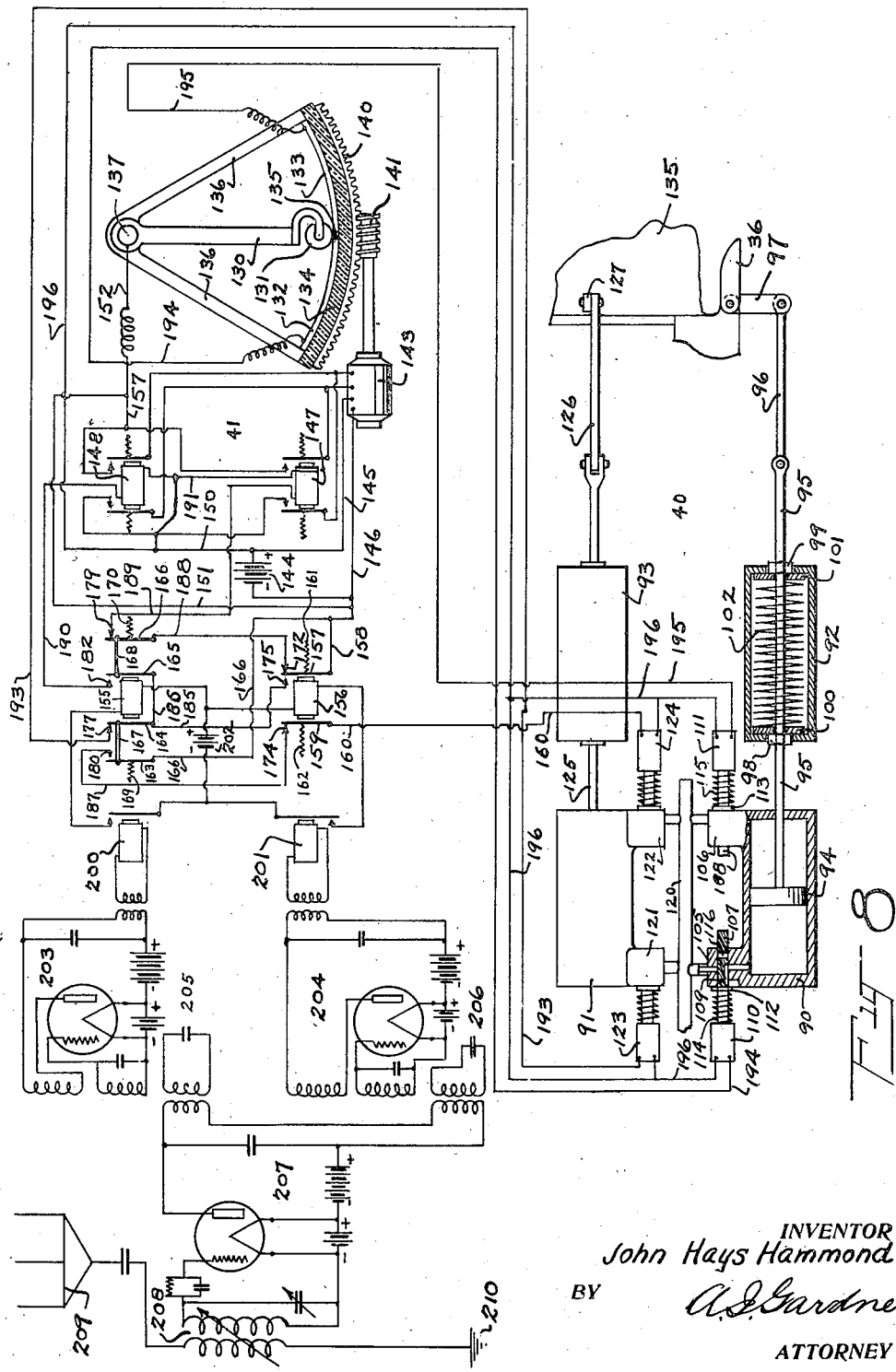

Aug. 11, 1931.        J. H. HAMMOND, JR            1,818,708
            RADIO DYNAMIC CONTROL OF GLIDING BODIES
            Original Filed Nov. 15, 1922    8 Sheets-Sheet 5
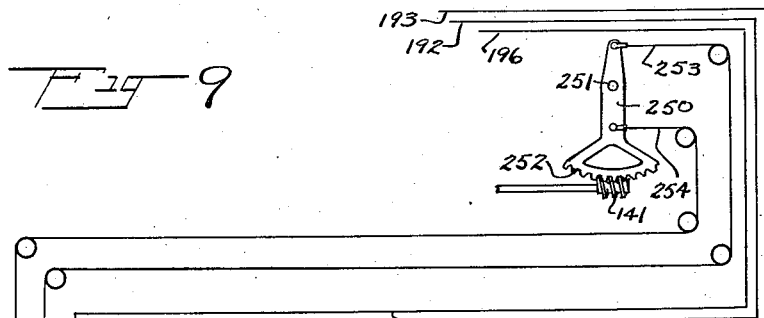
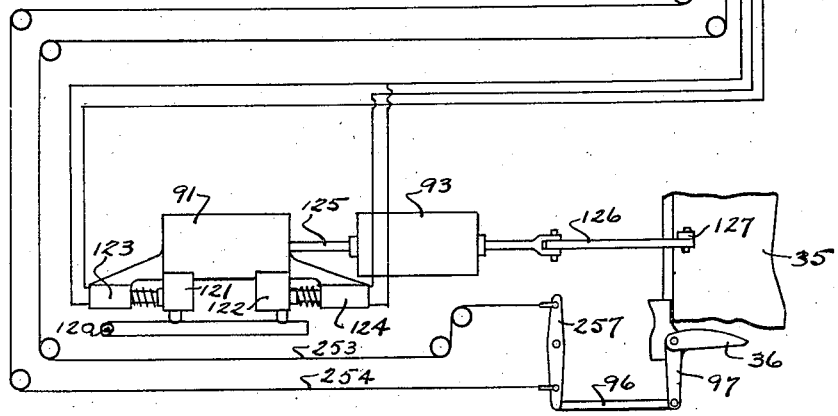
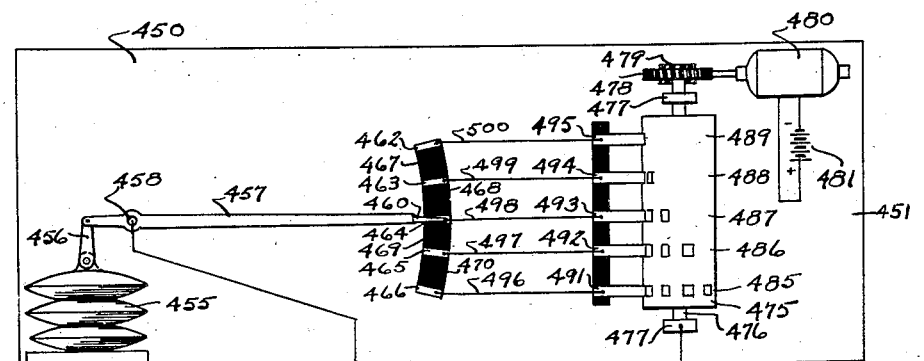
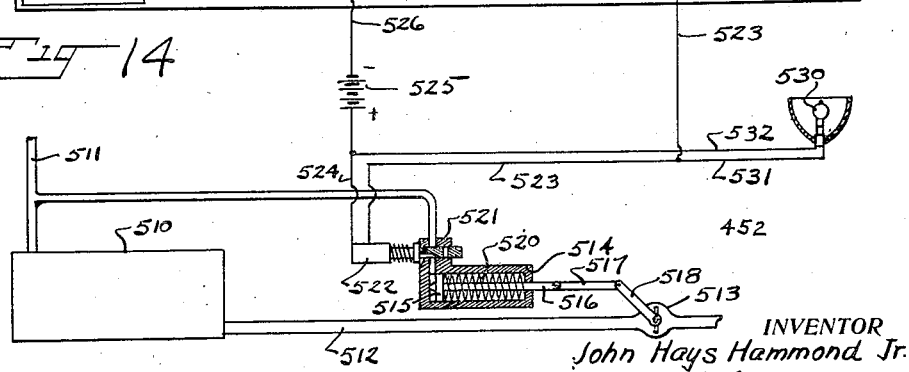
INVENTOR
John Hays Hammond Jr.
BY
ATTORNEY

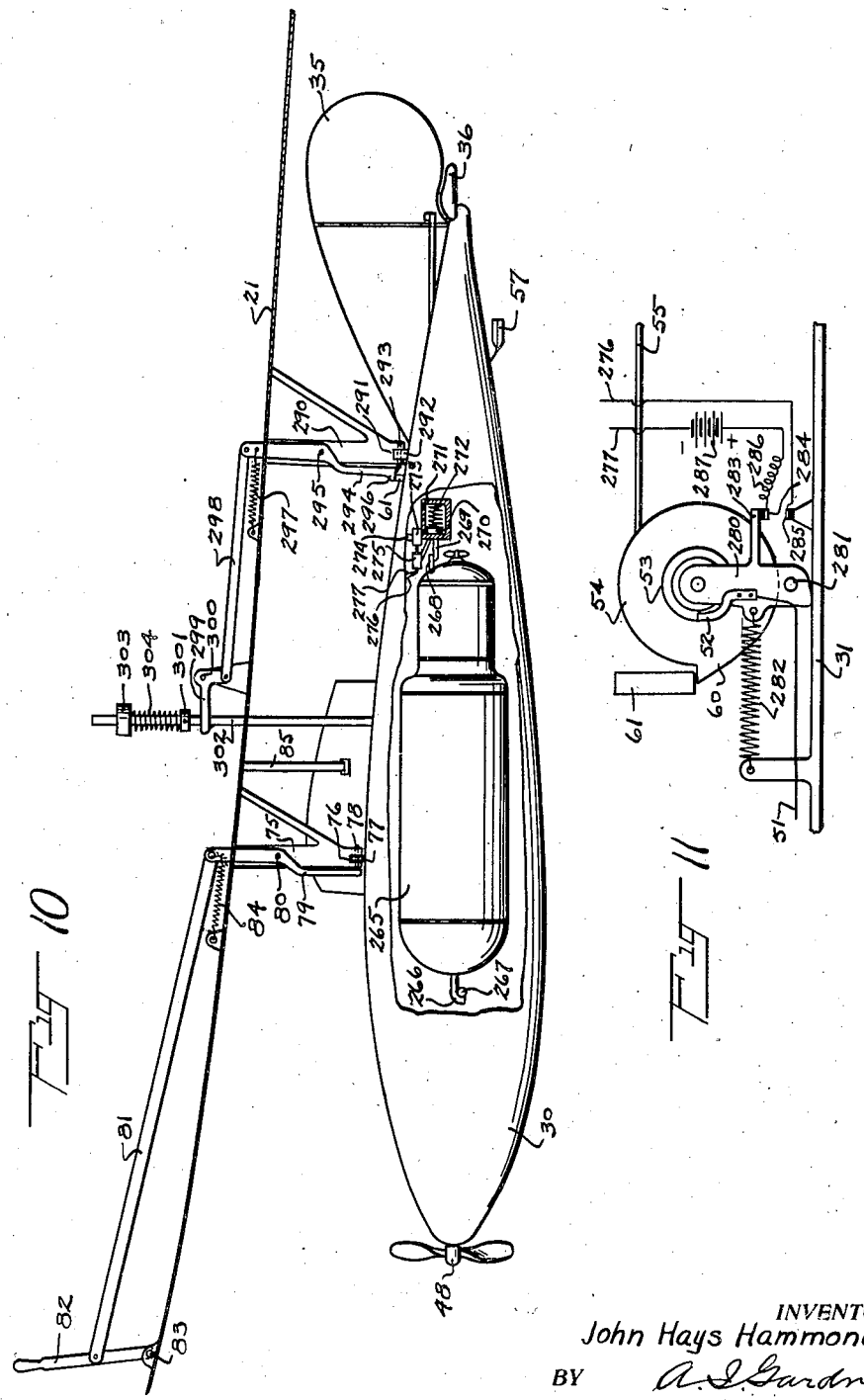

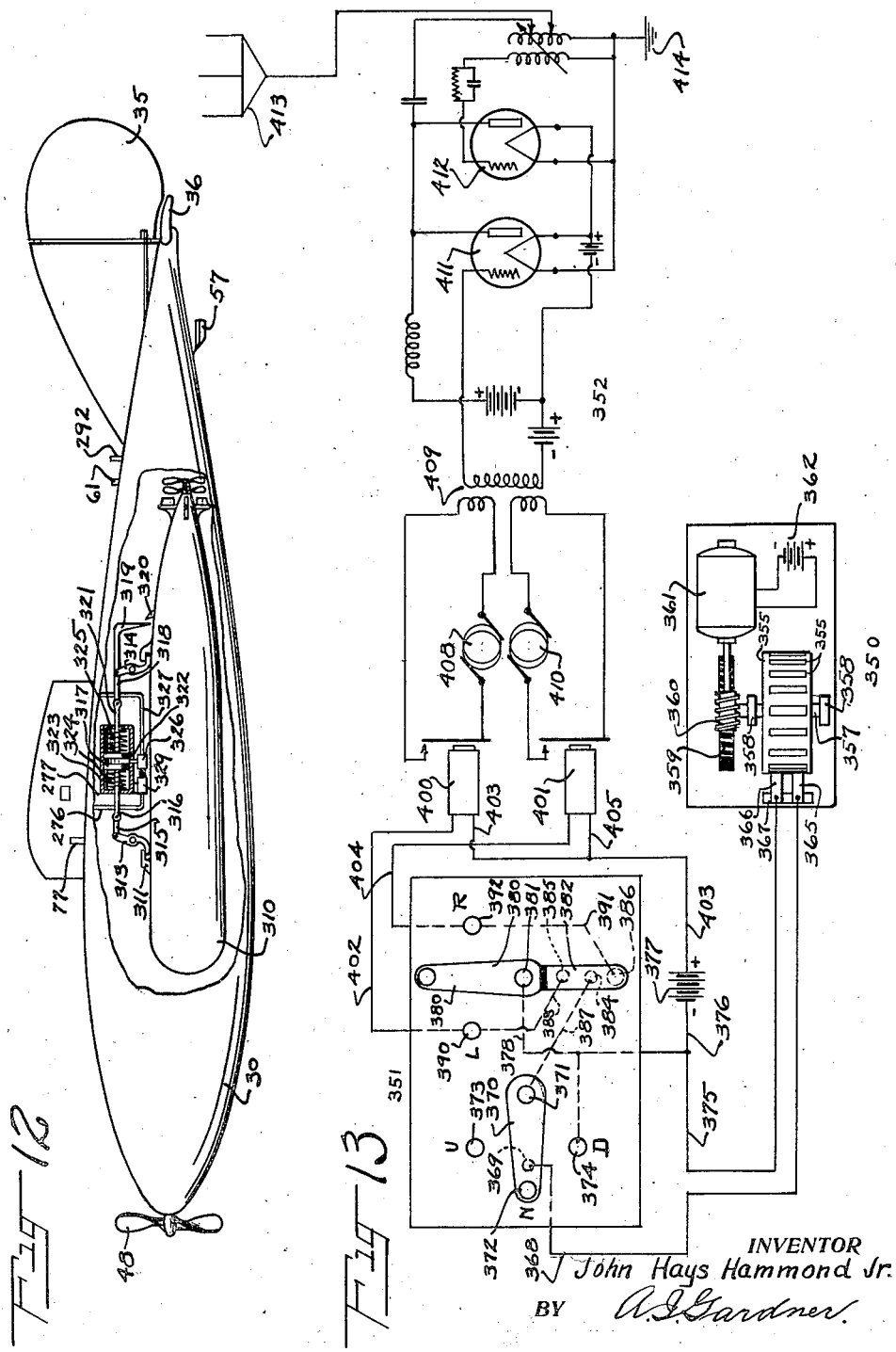

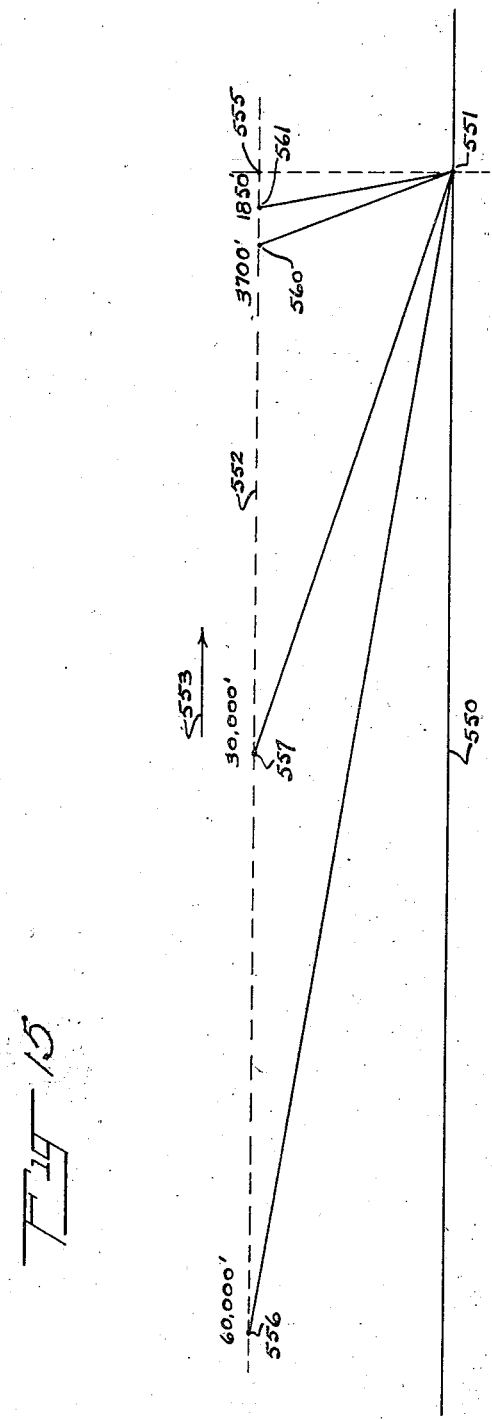

Patented Aug. 11, 1931

1,818,708

UNITED STATES PATENT OFFICE

JOHN HAYS HAMMOND, JR., OF GLOUCESTER, MASSACHUSETTS

RADIO DYNAMIC CONTROL OF GLIDING BODIES

Application filed November 15, 1922, Serial No. 601,088. Renewed August 8, 1929.

Some of the objects of the present invention are to provide for the radio dynamic control of the course of a gliding body; to provide improved means for maintaining a predetermined angle of descent of the glider; to provide means for modifying the angle of descent according to radiant signals; to provide means for delaying the descent of the glider should the radiant signals cease; to provide control mechanism for controlling the course of the glider comprising means for emitting a complex wave form to minimize interference; to provide for disengaging auxiliary matter from the glider at desired points in its travel; and to provide other objects as will appear hereinafter.

In the accompanying drawings, Figure 1 is a front elevation of an airplane with a glider suspended therefrom; Figure 2 is a side elevation of the same; Fig. 3 is a front elevation of the glider shown in Figure 1; Figure 4 is a side elevation of the glider; Fig. 5 is a plan view of the same; Figure 6 is a side elevation, partly in section, of the glider attached to the airplane; Figure 7 is a detail of part of the mechanism shown in Figure 6; Figure 8 is a diagrammatic view of the control apparatus shown in Figure 6; Figure 9 is a modified form of this control apparatus; Figure 10 shows a glider carrying a submarine mine; Figure 11 is an enlarged view of part of the apparatus used in the glider; Figure 12 shows a glider carrying a torpedo; Figure 13 is a diagrammatic view of the transmitting apparatus used in connection with this invention; Figure 14 is a diagrammatic view of a system used to indicate the altitude of the glider; Figure 15 is a view showing the different positions of the bombing plane under various conditions.

Referring to the accompanying drawings, and particularly to Figures 1 and 2; one embodiment of this invention comprises a movable body 20, that shown by way of example, being an aircraft of the form of a so-called Martin torpedo plane, it being understood that any desired form of plane may be used. The aircraft 20 consists of a fuselage 21, upper and lower planes 22 and 23, driving motors 24, and suitable landing gear 25. Suspended beneath the fuselage 21 is a separable gliding body, such as a gliding aircraft 30, consisting of a fuselage 31, (see Figs. 3, 4, and 5), upper and lower planes 32 and 33, a vertical rudder 35, and two horizontal rudders 36. The gliding body has no means of propulsion depending entirely on the wing surface of its planes to sustain it.

For operating the vertical and horizontal rudders 35 and 36 of the glider there is provided a steering mechanism 40, preferably located in the after end of the glider. The steering mechanism 40 is connected to a control mechanism 41, preferably located in the front of the glider, by means of an electrical cable 42, and is also connected to a source of compressed fluid such as a compressed air reservoir 43, by a pipe 44. The reservoir 43 is provided with a safety valve 45, and is connected by means of a pipe 46, to an air compressor 47, driven by means of an air propeller 48. The control mechanism 41, is connected by means of a conductor 51, to a brush 52, which presses against a slip ring 53, carried by a drum 54, which is rotatable in bearings 55. Coiled upon the drum 54, is an antenna wire 56, to the other end of which is secured a suitable trailer 57. The drum 54, is provided with a projection 60, which engages the lower end of a rod 61, which loosely passes through a bracket 62, and the upper part of the fuselage 31. Rigidly secured to the rod 61, is a collar 63. Surrounding the rod 61 between the collar 63, and the bracket 62, is a coil spring 64, which tends to move the rod 61, upwardly.

For maintaining in position on the airplane the rear end of the glider 30 there is provided on the airplane a bracket 70, the lower end of which is provided with a circular opening into which fits a circular shaped lug 71 which is rigidly secured to the upper surface of the fuselage 31. One side of this lug, 71, is flattened off, as shown at 72 in Figure 7, so that when the lug 71 is rotated through a small angle in a counter-clockwise direction, as seen in Figure 7, it will become disengaged from the circular opening in the bracket 73, which engages the upper end of the rod 61 thus holding it in the position shown in Figure 6, as long as the lug 71 is engaged by the bracket 70. A bracket 75, carried by the fuselage 21 of the airplane 20 is provided at its lower end with a slot 76, into which projects a lug 77, rigidly secured to the upper surface of the fuselage 31, of the glider 30. Projecting through suitable holes in the bracket 75, and the lug 77, is a pin 78, carried by a lever arm 79, which is pivoted at 80 to the bracket 75. Pivoted to the upper end of the lever 79 is a long link 81 to the front end of which is pivoted a hand lever 82, suitably mounted for rotation in bearings 83. A spring 84 is provided which holds the lever 79 in the position shown in Figure 6. Two posts 85, (see Fig. 1) are provided for steadying the glider 30, while it is being carried by the airplane 20.

In the embodiment shown in Figure 6 the glider 30 is shown carrying a high explosive bomb 87, which is provided with a suitable fuse 88, which may either be percussion type, time fuse, or a hydrostatic fuse which will be detonated when the bomb reaches a certain predetermined depth below the surface of the water in case the attack is to be made against an enemy marine vessel. All these fuses are of well-known and standard construction, and need not be more fully described herein.

The steering mechanism 40 consists of two pneumatic cylinders 90 and 91, and two spring cylinders 92 and 93. The cylinder 90 is provided with a piston 94, rigidly secured to a piston rod 95, which is connected by a link 96 to a lever 97, rigidly secured to the horizontal rudders 36. Rigidly secured to the piston rod 95, are two collars 98 and 99, which engage two discs 100 and 101, respectively, which are loose upon the rod 95, and which are normally held at the ends of the spring cylinder 92, by means of a coil spring 102. The cylinder 90 is provided with two valves 105 and 106 located at each end of the cylinder, which are controlled by valve stems 107 and 108 respectively, which are constructed so that when they are in the positions shown in Figure 8, they will connect the inside of the cylinder 90, to the atmosphere by means of ports 109. The valve stems 107 and 108 form the cores of solenoids 110 and 111. Rigidly secured to the valve stems 107 and 108 are two collars 112 and 113, against which press coil springs 114 and 115. When the solenoid 110 is energized the valve stem 107 is moved to the left against the spring 114, and a port 116 in the valve stem 107 connects the left hand side of the cylinder 90 to the compressed air supply pipe 120. In a similar manner, when the solenoid 111, is energized, the right hand side of the cylinder 90 is connected to the supply pipe 120.

The cylinder 91 is operated in a similar manner by valves 121 and 122, controlled by solenoids 123 and 124, respectively. The piston of the cylinder 91 is secured to a piston rod 125, which passes through the spring cylinder 93 and is connected by a link 126 to an arm 127, which is rigidly secured to the vertical rudder 35.

The control apparatus 41 consists of a pendulum 130 provided at its lower end with a spring pressed roller 131 which rides on segments 132, 133 carried by a curved piece of insulating material 134, and separated from each other by a strip of insulation 135. The strip of insulation 134, is carried by arms 136 which are pivoted on a fixed rod 137. The pendulum 130 is also pivoted upon this rod. Secured to the lower side of the strip of insulating material 134 is a segment of a worm gear 140. Meshing with this gear is a worm 141, carried by the shaft of a motor 143. The field winding of the motor 143, is connected across a battery 144 by means of conductors 145 and 146. For controlling the current to the armature of the motor 143, two motor relays 147 and 148 are provided. When the relay 147 is energized, current will flow from the battery 144 through conductors 150, 151 to the motor 143 so as to cause the worm 141 to rotate in a clockwise direction, as seen from the right, thus causing the segment 134 to be rotated in a counter-clockwise direction about the rod 137; and when the relay 148 is energized, it will cause the current from the battery 144 to flow through the armature of the motor, 143 in the opposite direction, so as to cause the segment 134 to be rotated in a clockwise direction. The pendulum 130 is suitably insulated from the rod 137, and is connected by a flexible conductor 152 to the conductor 151.

For energizing the motor relays 147 and 148 two steering relays 155 and 156 are provided. The relay 156 is provided with an armature 157 which is connected by a conductor 158 to the conductor 151, and is also provided with a secondary armature 159 connected by a conductor 160 to the winding of the solenoid 124. The armatures 157 and 159 are held in the positions shown by means of springs 161 and 162. The relay 155 is provided with four armatures, 163, 164, 165, and 166. The armatures 163 and 164 are connected together by a link of insulating material 167, and the armatures 165 and 166 are connected together by a link of insulating material, 168. The armatures 163 and 164 and the armatures 165 and 166 are held in the positions shown by springs 169 and 170 respectively.

When the armature 157 is in the position shown, it engages contact 172 and the armature 159 engages contact 174. When the magnet 156 is energized, the armature 157 engages a contact 175. When the armatures of the relay 155 are in the positions shown, the armature 164 engages contact 177, the armature 166 engages contact 179. When the relay 155 is energized, the armature 163 engages a contact 180, and the armature 165 engages contact 182.

Contact 175 is connected by a conductor 185 to the armature 164 and by a branch conductor 186 to the armature 165. The contact 174 is connected by a conductor 187 to the contact 180 and the contact 172 is connected by a conductor 188 to the armature 166. The contact 179 is connected by a conductor 189 to one side of the winding of the relay 147 and contact 182 is connected by a conductor 190 to one side of the winding of the relay 148. The other sides of the winding of these relays 147 and 148, are connected by a conductor 191 to the conductor 150. The contact 177 is connected by a conductor 193 to one side of the winding of solenoid 123. The segment 132 is connected by a flexible conductor 194 to one side of the winding of the solenoid 110 and the segment 133 is connected by a flexible conductor 195 to one side of the winding of the solenoid 111. The other side of the windings of the solenoids 124, 123, 110, and 111 are connected by conductors 196 to conductor 150.

In order to operate the steering relays 155, 156, two sensitive relays 200 and 201 are provided which when energized allow curent to flow from a battery 202 to either relay 155 or 156 respectively. The sensitive relays 200 and 201 are operated respectively by two autodyne circuits 203 and 204 which are controlled from filter circuits 205 and 206. The filter circuits 205 and 206 are in the output circuit of a detector 207, the input circuit of which is connected to a coupling transformer 208. The primary of the tuner 208 is connected to an antenna 209, and a ground or frame connection 210. The filter circuit 205 and the autodyne 203 are tuned to the B frequency, and a current of this frequency will cause the operation of the sensitive relay 200. The filter circuit 206 and the autodyne 204 are tuned to the B' frequency, and a current of this B' frequency will cause the operation of the sensitive relay 201.

The antenna 209 is positioned on the glider 30 in such a manner as to intercept Hertzian waves and is responsive to the energy emitted from the sending station, as will be subsequently set forth. The so-called "ground" connection 210, is a connection to the frame of the glider 30.

In the operation of the form of this invention, shown in Figures 1 to 7 of the drawings, the airplane 20 is started, and leaves the ground carrying the glider 30 with it. After flying to a point where it is desired to make the attack, the lever 82, is pulled backwards, which, by means of the link 81 causes the lever 79 to be rotated in a clockwise direction, thus causing the withdrawal of the pin 78 from the hole in the lug 77. This releases the forward part of the glider 30 which pivots about the lug 71. This motion continues until the lug 71 has rotated through a sufficient angle to allow it to slip out of the circular opening in the bracket 70. The glider 30 then being entirely free from the plane 20 begins to drop. This allows the rod 61 to move upward under the action of the spring 64, thus releasing the drum 54 which carries the antenna wire, 56. The force of the wind acting on the trailer 57 causes the antenna wire 56 to be unwound from the drum 54 until it has been all laid out. The inner end remains secured to the drum, 54 and is electrically connected to the slip ring 53 which conducts the incoming energy through the brush 52, and conductor 51 to the wireless apparatus shown in Fig. 8.

The glider then starts to descend at a predetermined angle, this angle being fixed by the position of the segment 134, with respect to the glider 30. In Figure 8 the roller 131 of the pendulum 130 is shown on the insulation 135 as it will be when the glider has assumed this predetermined angle. If the glider should tend to take a steeper angle of descent than this, the segment 134 will be rotated in a counter-clockwise direction with respect to the pendulum 130 and the roller 131 will therefore engage the segment 132 thus closing a circuit through conductor 194, solenoid 110, conductors 196 and 150, battery 144, conductors 151 and 152, pendulum 130 back to the roller 131 thus energizing the solenoid 110, which will cause the valve stem 107 to be moved to the left, thus connecting the left hand end of the cylinder 90 to the compressed air pipe 120. This will allow compressed air to enter the left hand side of the cylinder 90 thus forcing the piston 94 to the right, compressing the spring, 102 and rotating the horizontal rudder 36 in a counter-clockwise direction, which will tend to make the glider 30 take a less steep angle of descent, and thus bring it back to the predetermined course, at which time the roller 13, will be on the insulating 35, thus breaking the circuit through the solenoid 110, which will allow the valve stem 107 to move to the right under the action of the spring 114 thus cutting off the supply of air from the left hand side of the cylinder 90, and connecting the same to the atmosphere by means of the port 109. This piston rod 95 will be moved to the left under the action of the spring 102, against the disc 100 and collar 98, until it has returned the piston 94 and the horizontal rudder 36 to a central position, as shown in Figure 8.

If the glider should descend less steeply than the predetermined angle, the segment 134 will be rotated in a clockwise direction with respect to the pendulum, thus closing the circuit through the solenoid 111, which will operate the valve 106 to allow compressed air to enter the right hand side of the cylinder 90, thus rotating the horizontal rudder 36 in a clockwise direction, which will tend to bring the glider back to its predetermined course.

It is thus evident that as long as the position of the segment 134 is not shifted with respect to the glider 30 that the latter will be caused to descend at the predetermined angle.

For modifying the course of the glider by means of the steering mechanism, 40, and the control apparatus 41, a suitable wireless transmitting set, shown in Figure 13 and more fully described hereafter, is mounted in the airplane 20. This transmitting apparatus is so constructed that either of two frequencies B and B′ can be emitted as desired, and the receiver shown in Figure 8 is so constructed that it receives these impulses and causes them to operate either the sensitive relay 200 when B frequency is received, or the sensitive relay 201 when B′ frequency is received.

The sending apparatus is so constructed that normally it will send both B and B′ frequencies together for a brief interval of time, and then stop sending either for an approximately equal interval. When it is desired to cause the glider 30 to descend more steeply, both B and B′ frequencies are held on for a given interval of time, and thus energize both relays 200 and 201, simultaneously. When it is desired to cause the glider to descend less steeply, neither B nor B′ frequency is sent for a given interval. Thus the two relays, 200 and 201 are deenergized.

As shown in Figure 8, the two sensitive relays 200 and 201 are de-energized and therefore, the two steering relays 155 and 156 are also de-energized, thus closing a circuit from the battery 144 through conductors 151, 158, arm 157, conductor 188, armature 166, conductor 189, relay 147, conductors 191 and 150, back to the battery 144 which energized relay 147, thus causing the motor 143 to rotate the segment 134 in a counter clockwise direction. This brings the roller 131 into engagement with the segment 132, which as previously stated, causes the energization of the solenoid 110 which allows compressed air to enter the left hand side of cylinder 90 to rotate the horizontal rudder 36, in a counter clockwise direction. This will cause the glider 30 to lessen its angle of descent until the insulation 135 is under the roller 131 at which time the solenoid 110 will be de-energized, thus allowing the horizontal rudder 36 to be returned to the central position by the spring 102 as previously described.

The amount that the segment 134 is moved with respect to the glider 30 and therefore the change in the angle of descent, will be dependent upon the length of time that both relays 155 and 156 are de-energized, for as long as they are in this position, the motor 143 will tend to rotate the segment 134 in a counter-clockwise direction.

When the two sensitive relays 200 and 201 are both energized, the two steering relays 155 and 156 will also be energized, and will close a circuit from the battery 144, through conductors 151, 158, arm 157, conductors 185 and 186, armature 165, conductor 190, relay 148, and conductors 191 and 150 back to the battery 144. This will cause the energization of the relay 148, which in turn will cause the motor 143 to rotate the segment 134 in a clockwise direction. This will cause the roller 131 to engage the segment 133 thus closing the circuit through the solenoid 111, which will operate the valve 106 to cause the horizontal rudder 36 to be operated in a clockwise direction, as previously described.

Thus by sending the B and B′ frequencies together, the glider is caused to descend more steeply. The longer they are held on, the more steep the descent, and by stopping both B and B′ frequencies, the glider is caused to descend less steeply. The longer they are both stopped, the less steep will become the descent.

When it is not desired to change the angle of descent, both B and B′ frequencies are held on for a brief interval and then both stopped for an approximately equal interval. In this way, the segment 134 is first rotated through a small arc in a clockwise direction, and then immediately rotated through an equal arc in a counter-clockwise direction, so that the result is that it does not change its mean position with respect to the glider 30 and will therefore cause the glider 30 to keep an approximately constant angle of descent.

As previously stated, when the glider 30 is descending on a straight course, both B and B′ frequencies will be held on and off for approximately equal intervals of time. When, however, it is desired to steer the glider 30 to the left, only the B frequency is sent, and when it is desired to steer it to the right, only the B′ frequency is sent. For example, when it is desired to steer the glider 30 to the left, only the B frequency is sent, which energizes the sensitive relay 200, which in turn energizes the steering relay 155, thus moving its armatures 163, 164, 165, 166 toward the relay 155. This breaks the circuit between the conductors 188 and 189 thus de-energizing the relay 147 and therefore stops the rotation of the motor 143. At the same time a circuit is closed from the battery 144 through the conductors 151 and 166, armature 163, conductor 187, armature 159, conductor 160, solenoid 124, conductors 196 and 150 back to the battery 144. This energizes the solenoid 124 which operates the valve 122 to allow compressed air to enter the right hand end of the cylinder 91, thus moving the piston rod 125 to the left and rotating the vertical rudder 35 to the left, which in turn will steer the glider to the left. As long as the B frequency is held on the vertical rudder 35 will be held to the left. When it is desired to have the glider go on a straight course again, the B frequency is stopped thus de-energizing the relays 200 and 155, whereupon the armatures 163, 164, 165, and 166 will be moved, under the action of the springs 169 and 170, thus breaking the circuit from the solenoid 124 which in turn will allow the air to escape from the right hand end of the cylinder 91. The piston in this cylinder and the vertical rudder 35 will be returned to a central position under the action of the spring in the spring cylinder 93.

When it is desired to steer the glider 30 to the right, only the B' frequency is sent, which energizes the relay 201 and therefore the relay 156, thus causing the armatures 157 and 159 to move toward the relay 156, which will break the circuit to the conductor 188, thus preventing the motor 143 from being operated and at the same time will close a circuit from the battery 144 through conductors 151, 158, armature 157, conductor 185, armature 164, conductor 193, solenoid 123, conductors 196 and 150 back to the battery 144. This energizes the solenoid 123, which by means of the valve 121 allows air to enter the left hand side of cylinder 91, thus causing the vertical rudder 35 to be turned to the right. The rudder 35 will be held in this position as long as the B' frequency is received, but as soon as it ceases, the circuit from the solenoid 123 will be broken, and the rudder 35 will be returned to a central position under the action of the spring in the spring cylinder 93.

In the modified form of the invention shown in Figure 9, the segment 134 with its related parts has been replaced by a member 250 which is pivoted at 251 and the lower portion of which is formed into the sector of a worm wheel 252, which meshes with the worm 141, which is driven by the motor 143. Secured to the member 250 are two wire ropes, 253 and 254 which pass over suitable pulleys, and the other ends of which are connected to a lever 257, the lower end of which is pivoted to the link 96, which operates the horizontal rudder 36 by means of the lever 97.

The vertical rudder 35 is controlled by the air cylinder 91 and spring cylinder 93 as described in connection with Figure 8. The rest of the apparatus is identical with that shown in Figure 8, with the exception that the conductor 152 is omitted.

The operation of the modified form of the apparatus shown in Figure 9 is the same as that shown in Figure 8, except that the worm 141 instead of operating the segment 134 rotates the member 250, by means of the wire ropes 253 and 254 rotates the lever 257, which in turn controls the motion of the horizontal rudder 36.

It has been found that certain types of gliders assume definite gliding angles for certain positions of the horizontal rudders, so that by placing the horizontal rudder in a given position with respect to the longitudinal axis of the glider, the latter will be caused to descend at a predetermined angle. In this way the steepness of the descent can be varied in a manner similar to that described in connection with Figure 8.

In a modified form of the invention shown in Figure 10, the bomb 87 has been replaced by a submarine mine 265, of any suitable or well-known construction, which may be provided with a hydro-static device, such as the Leon mechanism, which keeps the mine floating at a predetermined distance below the surface of the water. The front end of the mine 265 as seen in Figure 10, is provided with a hook 266, which engages with a transverse rod 267, rigidly secured to the fuselage 31 of the glider 30. At the rear end of the mine 265 is provided a lug 268, which engages one end of a piston rod 269, the other end of which is rigidly secured to a piston 270 that reciprocates in a cylinder 271, and which is held at the left hand end of the cylinder of a coil spring 272. The cylinder 271 is provided with any suitable valve 273, such as that shown at 105 of Figure 8, this valve being connected to the supply of compressed air by the pipe 274, and is operated by a solenoid 275, the winding of which is connected to two wires 276 and 277.

For operating the cylinder 271, and thus releasing the mine, 265, when the glider 30 is at a predetermined distance above the surface of the water, the mechanism shown in Figure 11 is provided. This mechanism consists of the antenna wire drum 54 mounted upon a pivoted arm 280 which is pivoted at 281 to the fuselage 31 of the glider, and is held in the position shown in Figure 11 by means of a coil spring 282. The arm 280 carries a contact arm 283 upon which is mounted a contact 284 which cooperates with a second contact 285 mounted upon, but insulated from, the fuselage 31. The contact 284 is connected by a flexible conductor 286 to one side of a battery 287, the other side of which is connected to the conductor 277. The contact 285 is connected to the conductor 276.

For holding the rear end of the glider 30 a bracket 290 is provided, which is rigidly secured to the fuselage 21 of the airplane 20. The lower end of the bracket 290 is provided with a slot 291, into which slides a lug 292. Through concentric holes in the bracket 290 and the lug 292, projects a pin 293 which is carried by a lever 294, pivoted at 295 to the bracket 290. The lower end of the lever 294 is provided with a projection 296 which engages a pin 61, and performs the same function as the projections 73, shown in Figure 6. The lever 294 is held in the position shown in Figure 10 by means of a coil spring 297. The upper end of the lever 294 is pivoted to one end of a link 298, the other end of which is pivoted to a bell crank 299, which is pivoted for rotation about the rod 300, which is rigidly carried by the fuselage 21. Cooperating with one arm of the bell crank 299 is a collar 301, rigidly secured to a rod 302, which has bearings in the bracket 303 and the fuselage 21. A coil spring 304 surrounds the rod 302 between the collar 301 and the bracket 303. The lower end of the rod 302 presses against the upper surface of the fuselage 31.

In the operation of the modified form of the invention shown in Figures 10 and 11, when it is desired to release the glider 30, from the airplane 20 the lever 82 is pulled backwards, and releases the lug 77 as described in connection with Figure 6. As the forward part of the glider 30 begins to drop the rod 302 still pressing against the upper surface of the fuselage 31 moves downward under the action of the spring 304 until the collar 301 engages the bell crank 299, and causes it to rotate, which, by means of the link 298 rotates the lever 294 in a clockwise direction, thus withdrawing the pin 293 from the hole in the lug 292, thus releasing the rear end of the glider 30 which starts to descend, and which is controlled as described in connection with Figures 6, 7 and 8. When the glider 30 has reached a predetermined distance above the surface of the water, depending upon the length of the antenna 56, the trailer 57 will strike the water and will be retarded sufficiently to cause the antenna wire 56 to pull the reel 54 backward, thus rotating the arm 280 in a clockwise direction about the pivot point 281 until the contact 284 engages the contact 285, thus closing the circuit from the battery 287 through the conductor 286, contacts 284 and 285, conductor 275 solenoid 276 and conductor 277, back to the battery 287, thus energizing the solenoid 275, which will operate the pneumatic valve 273, to allow compressed air to enter the left hand side of the cylinder 271, thus moving the piston 270 to the right, against the action of the spring 272 until the lug 268 is released thereby causing the rear end of the mine, as seen in Figure 10, to drop through the bottom of the glider 30 which, in this case, is made of a thin covering at this point. The mine 265 will therefore rotate about the rod 267 until it assumes an approximately vertical position, when the hook 266 will slip off rod 267 and the mine 265 will be dropped from the glider into the water, where it will assume the predetermined depth already referred to.

In the modified form of the invention shown in Figure 12, the glider 30 is shown carrying a torpedo 310, which may be either of a standard form or a radio dynamically controlled torpedo which can be controlled from a suitable transmitting apparatus located in the airplane 20. The torpedo 310 is provided with two lugs 311 and 312, which are engaged by palls 313 and 314. The pall 313 is connected by a link 315 to a piston rod 316, the other end of which is rigidly secured to a piston 317. The pall 314 is pivoted to a member 318, one end of which is provided with a projection 319, which engages the starting lever 320 of the torpedo 310. The other end of the member 318 is pivoted to a piston rod 321, the other end of which is rigidly secured to a piston 322. The pistons 317 and 322 slide in a cylinder 323 and are held in a central position in the cylinder 323, by means of coil springs 324 and 325. The cylinder 323 is provided with a pneumatic valve 326, which is connected by a pipe 327 to the supply of compressed air. The valve 326 is operated by a solenoid 329 the winding of which is connected to the conductors 276 and 277, previously referred to in Figures 10 and 11.

The operation of the modified form of the invention shown in Figure 12 is similar to that described for the forms shown in Figures 10 and 11. When the glider 30 has reached a predetermined distance above the surface of the water, the trailer 57 will strike the water and close the circuit through the conductors 276 and 277, thereby energizing the solenoid 329, which operates the valve 326 to allow compressed air to enter the cylinder 323, thus forcing the pistons, 317 and 322 apart, which causes the rotation of the palls 313 and 314, and releases the torpedo 310 and at the same time trips the starting lever 320. The torpedo 310 then drops through the bottom of the glider 30 into the water, and proceeds upon its course under the action of its own mechanism.

In Figure 13 is diagrammatically represented a wireless transmitting mechanism, carried by the plane 20, and referred to in connection with the operation of the form of the invention shown in Figure 8. The transmitting apparatus consists of an interrupter 350, a control panel 351, and wireless apparatus 352. The interrupter 350 is provided with a drum 355 of any suitable insulating material, into which is set strips 356 of conducting material. The drum 355 is rigidly mounted upon a shaft 357 mounted in bearings 358 to one end of which is rigidly secured a worm wheel 359. Meshing with the worm wheel 359 is a worm 360 carried by the shaft of a motor 361, which is driven at a constant speed by any suitable source of energy, such as a battery 362.

Cooperating with the drum 355 are two brushes 365 and 366 which are carried by an upright 367. The brush 365 is connected by a conductor 368 to a contact 369 located on the control panel 351. Cooperating with the contact 369 is a suitable switch arm 370 pivoted at 371 and provided with a handle 372. The switch arm 370 also cooperates with two contacts 373 and 374, the latter being connected by a conductor 375 to the brush 366, by a branch conductor 376, to a battery 377 and by a second branch conductor 378 to a switch arm 380 which is pivoted at 381 and is provided with a lower switch arm 382, insulated from the main switch arm 380. When the switch arm 380, 382 is in the position shown, the lower part 382 engages three contacts 384, 385, and 386. Contact 384 is connected by a conductor 387 to the switch arm 370; contact 385 is connected by a conductor 388 to a contact 390; and contact 386 is connected by a conductor 391 with a contact 392. At suitable times, the contact 390 or the contact 392, is engaged by the switch arm 380.

For controlling the sending of the B and B' frequencies by the wireless apparatus 352, two relays 400 and 401 are provided. One side of the winding of the relay 400 is connected by a conductor 402 to the contact 390, the other side of the winding being connected by a conductor 403 to the battery 377. One side of the winding of the relay 401 is connected by a conductor 404, to the contact 392, the other side of the winding being connected by a conductor 405, to the conductor 403.

When the relay 400 is energized it closes a circuit consisting of a suitable source of oscillations 408, of B frequency, such as an alternator, or oscillation tube and one side of the primary of a transformer 409. When the relay 401 is energized, it closes a circuit consisting of a source of oscillations 410, of B' frequency, and the other side of the primary of the transformer 409. The secondary of the transformer 409 is connected to a modulation tube 411, which modulates the output of a radio oscillator 412. The latter is connected to an antenna 413, and a "ground" 414. The so-called "ground" connection is a connection to the frame of the aeroplane. When the relay 400 is energized, the B frequency will be emitted by the antenna 413, and when the relay 401 is energized, the B' frequency will be emitted.

The operation of the transmitter which is carried by the airplane is as follows: The motor 361 running at a constant speed, drives the drum 355 at a constant speed, by means of the worm 360 and worm wheel 359. As the drum 355 rotates the brushes 365 and 366 are alternately brought into engagement simultaneously with the strips 356, and the insulating surface of the drum 355. When the brushes 365 and 366 engage the strips 356, a circuit will be closed from the battery 377 through conductors 376, 375, brush 366, strip 356, brush 365, conductor 368, switch arm 370, conductor 387, to the switch arm 282, which distributed the current through both of the magnets 400 and 401, from which it is returned by the conductors 403 and 405 to the battery 377. This energizes both of the magnets 400 and 401 which cause the wireless apparatus 355 to emit both B and B' frequencies, which, as previously described, operate the relays 155 and 156 (see Figure 8) thus causing the glider to descend more steeply. When the brushes 365 and 366 are on the insulating part of the drum, 355, the circuit is broken through both of the relays 400 and 401, which are thereby de-energized, thus stopping the emission of both B and B' frequencies. This will cause the de-energization of the relays 155 and 156, which, as previously described, will cause the glider to take a less steep angle of descent. As the drum 355 rotates past the brushes, 365 and 366, both B and B' frequencies will be sent simultaneously for a brief interval, and then stop for an approximately equal interval, thus causing the glider to descend at an approximately constant angle.

When it is desired to cause the glider to descend at a steeper angle, the switch arm 370 is moved in a counter-clockwise direction, until it engages the contact 374 which opens the circuit from the interrupter 350 and closes the circuit from the battery 377, through both of the relays 400 and 401, thus causing a continuous emission of the B and B' frequencies, which, as previously described, will cause the glider to take a steeper angle of descent. When it is desired to decrease the angle of descent of the glider, the switch arm 370 is moved in a clockwise direction until it rests upon the contact 373 which is not electrically connected to any of the apparatus, and thereby opens the circuit through the relays 400 and 401, which remain de-energized as long as the switch arm 370 remains in this position, thus stopping both B frequencies, which in turn causes the glider to take a less steep angle of descent.

When it is desired to steer the glider to the left, the switch arm 380 is moved in a counter-clockwise direction until it rests upon the contact 390, thus breaking the circuit from the conductor 387, and therefore from the interrupter 350, and closing the circuit from the battery 377 through conductors 376, 375, 378, switch arm 380, contact 390, conductor 402, relay 400 back along conductor 403, to the battery 377, thereby energizing the relay 400, which causes the wireless apparatus 352 to emit only the B frequency, which, as previously described, energizes the relay 155 thus causing the glider to be steered to the left. When it is desired to steer the glider to the right, the switch arm 380 is moved in a clockwise direction until it engages the contact 392, thereby closing the circuit through the relay 401, which causes only the B' frequency to be emitted which operates the relay 156 thus steering the glider to the right.

In Figure 14 is shown a system of indicating when the glider 30 is at a certain predetermined altitude so that the operator located in the airplane 20 can tell the altitude of the glider above the surface of the earth. This is necessary for him to know in order to properly control its descent during the remainder of its flight.

This system comprises an altitude indicator 450, an interrupter mechanism 451 and indicating means 452. The altitude indicator 450 consists of a suitable aneroid 455, of any well known construction, which is connected by means of a link 456 to one end of a lever 457 which is pivoted at 458. The other end of the lever carries a contact 460 which rides over a segment 461 composed of alternate strips of conducting material 462 to 466 and insulating material 467 to 470.

The interrupter mechanism 451 consists of a drum of insulating material 475 which is carried by a shaft of conducting material 476 supported in bearings 477 and provided at one end with a worm wheel 478. The worm wheel 478 is driven by worm 479 carried on the shaft of a motor 480 which is driven at a suitable speed by means of a battery 481. The drum 475 is provided with suitable groups of contacts 485 to 489 which are electrically connected to the shaft 476 and which as the drum 475 is revolved make contact with brushes 491 to 495 respectively. The brushes 491 to 495 are connected by conductors 496 to 500 to the strips 466 to 462 respectively.

The indicating means 452 may be of any suitable type, but in this form of the invention shown, is a smoke producing means which consists of a container 510 into which any suitable smoke producing substance is introduced and which is connected by a pipe 511 to the compressed air reservoir 43. The container 510 is also provided with an outlet pipe 512 which is controlled by a valve 513. The valve 513 is operated by a cylinder 514, the piston 515 of which is connected by a piston rod 516 and a link 517 to the arm 518 of the valve 513. A spring 520 is provided in the cylinder 514 for returning the piston 515 to the left hand end of the cylinder 514. The flow of compressed air into the cylinder 514 is controlled by a valve 521 which is similar to valve 105 of Figure 8 and is operated by a solenoid 522, one side of the winding of which is connected by a conductor 523 to the interrupter mechanism 451, and the other side of the winding of which is connected by a conductor 524 to one side of a battery 525. The other side of this battery is connected by a conductor 526 to the lever 457. A lamp bulb 530 is connected in parallel with the solenoid 525 by means of conductors 531 and 532.

In the operation of the form of the invention shown in Figure 14, the aneroid 455 by means of the link 456 causes the lever 457 to take definite positions for definite atmospheric pressures, which, as is well known, correspond to given altitudes. If found advisable, any standard means for making an initial adjustment of the aneroid for various atmospheric conditions, or for the elevation of the starting point above sea level may be employed. Assuming that the glider 30 is released, for example, the airplane 20 is at an altitude of 5000 feet, the aneroid 455 will have expanded to such an extent that the contact 460 will be on the contact strip 466, thus closing a circuit from the battery 525 through conductor 526, arm 457, contact 460, strip 466, conductor 496, brush 491, contacts 485, conductor 523, solenoid 522 and conductor 524 to battery 525. A circuit will also be closed from conductor 523, through conductor 531, lamp 530, conductor 532 and to conductor 524. These circuits will be alternately closed and opened by means of the commutator 475. The number of times which the circuits are closed for each revolution of the drum 475, will depend upon the number of contacts 485 in the selected row. In this case, the circuits are intermittently closed five times per revolution. The lamp 530 will be lighted and the solenoid 522 will be energized five times in succession, thus emitting five flashes of light and five puffs of smoke. This procedure will be repeated for each revolution of the drum 475 until the glider has descended sufficiently to cause the aneroid 455 to rotate the arm 457 a sufficient amount in a counter clockwise direction to bring the contact 460 upon the insulated segment 470, thus breaking the circuits and stopping the emission of light and smoke.

When the glider has descended to an altitude of 4000 feet, the aneroid will have moved the contact 460 on to the strip 465 of conducting material which will close the circuits through the brush 492 and the contacts 486. As there are only four of these contacts, four flashes of light and four puffs of smoke will be emitted until the glider has descended below this altitude. In a similar manner when the glider reaches 3000 feet, three flashes of light and three puffs of smoke will be emitted, and a similar action will take place at 2000 and 1000 feet, so that the operator in the airplane 20 will know the approximate altitude of the glider.

For the purposes hereinbefore described, any suitable type of glider could be used, but preferably one similar to that shown in Figures 3, 4, and 5, which could have a total wing span of 8 feet 6 inches, with a 20 inch cord, and an over-all length of 9 feet. A glider of this type could be constructed with ply-wood bulkheads, and longitudinal battens covered with fabric. The wings could be constructed of solid wood, preferably balsa, and braced by suitable struts. The bomb carried by this glider, and shown at 87 in Figure 6, could be of standard construction, such as a 300 pound bomb which has a length of 50 inches, and is 12 inches in diameter. The weight of this glider would be approximately 150 pounds, thus making the total weight 450 pounds for the glider and bomb.

A glider of this construction would be inherently stable, and would not require any lateral control, thus making it necessary only to steer the glider. A glider of this construction could be slung under the fuselage of the plane illustrated in Figures 1 and 2.

With this type of glider, the normal gliding angle would have a slope of about one in six, and the speed of the glider would be approximately 80 miles per hour. The maximum gliding angle for complete control would be about one in six, although of course the glider could be caused to take a nose dive when nearly above the target. The control of the glider during the dive, however, would not be as complete as when gliding.

In Figure 14 is shown the relative positions of bombing planes when using the glider just described, and also when dropping standard bombs. The surface of the ground in this figure is indicated by 550, and the target is located at a point 551. The bombing plane is assumed to be flying at an altitude of 10,000 feet along the dotted line 552 in the direction of the arrow 553. The point where the plane would cross a vertical line above the target is indicated at 555. The maximum distance at which the bombing plane could be, and still have the glider reach the target 551, would be about 60,000 feet, as indicated at the point 556, and the minimum distance at which the bombing plane could be and have the glider reach the target under complete control, would be about 30,000 feet, as indicated at 557. If the bombing plane is nearer to the target than this distance, the glider can be steered to a position over the target and then caused to take the nose dive directly down upon the target.

If the bombing plane were to use ordinary bombs, it would have to approach much nearer to the target, as indicated by the points 560 and 561, the point 560 being at about 3700 feet distance from the target, and being the point at which a bombing plane, flying at 100 miles per hour, would have to release its bomb in order to have it strike the target 551. If the plane, however, was only traveling at 50 miles per hour, it would have to be at the point 561 before dropping its bomb, which would be at an approximate distance of 1850 feet.

It is obvious from the foregoing that a bombing plane using a glider bomb could remain at a much greater distance from the target, and therefore not have to pass through a barrage, than one using the ordinary type of bomb, which has to be much nearer vertically over the target than the former.

The invention upon which this application is based is broader than the specific embodiments shown and described for the purpose of illustrating some of the ways in which it may be employed. The scope of the invention is therefore understood not to be limited by the present specific description. I intend no limitations other than those imposed by the appended claims.

What I claim is:

1. In combination, an aircraft, means for maintaining normally a predetermined angle of descent, and means for controlling said maintaining means operable by intermittent radio signals to hold the aircraft to substantially said predetermined angle of descent and by a continuous series of radio signals to increase the steepness of descent.

2. In combination, an aircraft, means for maintaining normally a predetermined angle of descent, and means for controlling said maintaining means operable by intermittent radio signals to hold the aircraft to substantially said predetermined angle of descent and by a cessation of said signals to decrease the angle of descent.

3. In combination, an aircraft, means for maintaining normally a predetermined angle of descent, and means for controlling said maintaining means operable by intermittent radio signals to hold the aircraft to substantially said predetermined angle of descent and by a continuous series of radio signals to increase the steepness of descent and by entire cessation of said signals to decrease the angle of descent.

4. The combination with a dirigible body arranged to glide downwardly, means to increase the rate of descent, and means to steer the body laterally in either direction, of two electromagnets arranged to maintain the steering means adjusted to a predetermined course when both magnets are energized, and to actuate said steering means to steer in one direction when one of the magnets is deenergized and to actuate said rate increasing means when both magnets are retracted.

5. The combination with a dirigible body arranged to glide downwardly, means to increase the rate of descent, and means to steer the body laterally in either direction, of two electromagnets arranged to maintain the steering means adjusted to a predetermined course when both magnets are energized, and to actuate said steering means to steer in one direction when one of the magnets is de-energized and to actuate said rate increasing means when both magnets are retracted, and a sending station remote from said body arranged to emit radiant energy to control said electromagnets.

6. The combination with a dirigible body arranged to glide downwardly, means to increase the rate of descent, and means to steer the body laterally in either direction, of two electromagnets arranged to maintain the steering means adjusted to a predetermined course when both magnets are energized, and to actuate said steering means to steer in one direction when one of the magnets is de-energized, and to actuate said rate increasing means when both magnets are retracted, and means positioned for selectively emitting a desired signal at a predetermined altitude.

7. In combination, an aircraft, a body carried by said aircraft, a radio antenna carried by said aircraft, means for controlling said aircraft by radio, and means for releasing said body upon contact of said antenna with the earth.

8. In combination, an aircraft, and means responsive to altitude of said aircraft located on said aircraft for indicating to a point remote from the aircraft the altitude thereof.

9. In combination, an aircraft, means on the aircraft for indicating the amount of altitude to a point remote from the aircraft and means for remotely controlling said aircraft in accordance with the indicated altitude.

10. In combination, an aircraft, means to cause said aircraft normally to maintain a predetermined angle of descent, means for controlling the orientation of said aircraft in azimuth, and for controlling the angle of descent, a receiving system responsive to energy from a source external to said aircraft for controlling said means, said receiving system being arranged, upon cessation of received energy, to cause said aircraft to take said predetermined angle of descent, irrespective of the particular angle of descent at the instant of cessation of receiving energy.

11. In combination, an aircraft, means to cause said aircraft to normally glide at a predetermined angle of descent, means including a radiant energy transmission system to control the aircraft in its flight and to cause the aircraft to dive at any point in its flight, and means for causing said aircraft to resume its normal gliding at said predetermined angle of descent, irrespective of the particular angle of descent at the instant when said radiant energy transmission system is rendered inactive.

12. In combination, an aircraft, means for causing said aircraft to take a predetermined course relative to horizontal, control means for altering with respect to horizontal said predetermined course, and safety devices for causing said body to return to said predetermined course relative to horizontal upon inoperation of said control means, irrespective of the particular course relative to horizontal at the time of such inoperation.

In testimony whereof I hereunto affix my signature.

JOHN HAYS HAMMOND, Jr.